3,428,675
PROCESS FOR THE PREPARATION OF OXALIC ACID
Bernard Pierre Brossard, Jacques Boichard, Michel Louis Marie Joseph Gay, Raymond Marc Clement Janin, and Louis Marius Elie Pichon, Lyon, France, assignors to Rhone-Poulenc S.A., Paris, France, a corporation of France
Filed July 1, 1966, Ser. No. 562,149
Claims priority, application France, July 5, 1965, 23,501
U.S. Cl. 260—533
Int. Cl. C07c *51/20*
6 Claims

ABSTRACT OF THE DISCLOSURE

Ethylene is oxidized to oxalic acid by nitric acid in the presence of sulfuric acid.

---

The present invention concerns a process for the preparation of oxalic acid by oxidation of ethylene with nirtic acid.

A number of processes for the preparation of oxalic acid by oxidation of propylene with nitric acid have already been proposed. Thus, German Patent No. 742,053 describes a process for the oxidation of propylene with nitric acid at between 50° and 70° C., in the presence or absence of oxygen, under normal or superatmospheric pressure.

In United States Patent No. 3,081,345 it has been proposed to oxidise propylene to oxalic acid by a two-stage process. The propylene is first oxidised with liquid nitrogen peroxide at between −30° and +21° C., and the partial oxidation product thus obtained is then treated at elevated temperature with a mixture of sulphuric and nitric acids, or with nitric acid alone, or with nitrogen dioxide under pressure.

These processes have the disadvantage that they utilise a starting material and molecule of which contains 3 carbon atoms in the manufacture of a product whose molecule contains only 2 carbon atoms. Part of the propylene molecule is therefore lost in the course of the oxidation.

While 466 g. of propylene are theoretically required to produce one kilogram of oxalic acid, 310 g. of ethylene are theoretically sufficient to produce the same result. It is therefore desired to be able to produce oxalic acid by the direct oxidation of ethylene rather than propylene. The oxidation of ethylene with nitric acid is known to produce some oxalic acid (Akestorides J. Prakt. Chemie (2), 15, 62 (1877); Wieland et al. Ber., 53, 201 (1920)). However, the yields of oxalic acid do not exceed 26%.

It has now been found that oxalic acid is obtained in good yields by the oxidation of ethylene with nitric acid if the operation is carried out in the presence of sulphuric acid and certain conditions of concentration are observed. It has also been found that if the reaction medium contains a small quantity of nitrogen dioxide in solution in the mixture of sulphuric and nitric acids, the oxalic acid yields are greatly improved.

The new process for the preparation of oxalic acid coprises oxidizing ethylene with a hot mixture of 30 to 80% by weight of nitric acid, 5 to 50% by weight of sulphuric acid, and 10 to 40% by weight of water, this composition being maintained throughout the oxidation.

Figure 1:
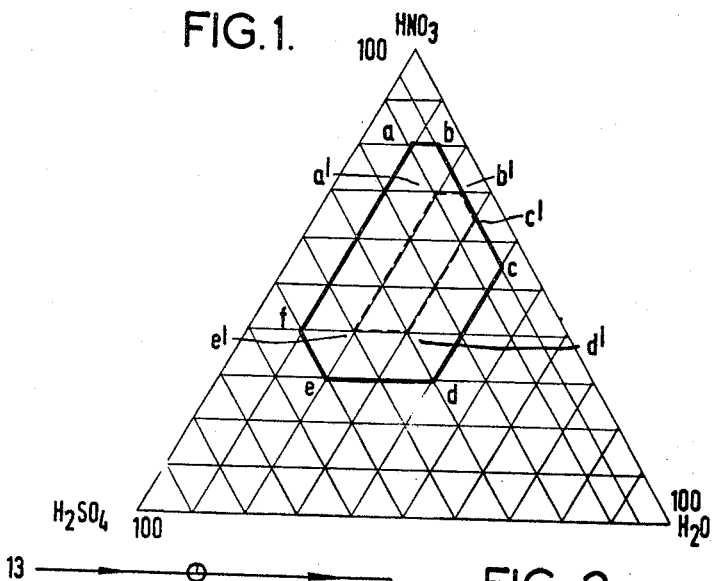

The composition of the oxidizing mixture may be represented by the hexagon *a, b, c, d, e, f* shown in FIGURE 1 of the accompanying drawings. The oxidation is preferably carried out with a mixture of 40% to 70% of nitric acid, 20% to 30% of water, and 5% to 40% of sulphuric acid, i.e., with a mixture represented by the pentagon *a', b', c', d', e'* in FIGURE 1.

When the oxidizing mixture contains nitrogen peroxide, the yield of oxalic acid increases with the proportion of nitrogen dioxide in the mixture, at least up to a certain proportion. In practice, quantities of nitrogen peroxide greater than 5% of the weight of the mixture do not appreciably increase the yields, and generally, there is no advantage in exceeding a proportion of 3%. When the oxidizing mixture contains nitrogen peroxide the proportion of suphuric acid may be lowered below the minimum value of 5% previously maintained, and may be as low as 2.5%, for example.

The optimum reaction temperature depends upon the composition of the oxidizing mixture, but generally speaking, is 35° to 80° C., and preferably 50° to 70° C.

After the ethylene has been brought into contact with the oxidising mixture, the reaction mixture should be maintained at 35–80° C., preferably 50–70° C., until no further gases (oxides of nitrogen) are evolved. The time taken for this varies with the temperature and the composition of the reaction mixture.

The composition of the oxidising mixture must be kept within the above-defined limits while the ethylene is admitted thereto. This result may be achieved, for example, by using initially an oxidising mixture whose composition remains within the limits of the hexagon *a, b, c, d, e, f* in FIGURE 1 throughout the oxidation. Alternatively, periodic or continuous additions, either of nitric acid alone or of both nitric acid and sulphuric acid, may be made to the oxidizing mixture in amounts such as to maintain the composition of the oxidizing mixture at or near a predetermined value within the above-defined limits. This nitric acid may be added in the form of fresh nitric acid only or in the form of a mixture of fresh nitric acid and nitric acid obtained by oxidation and treatment with water of the nitrous vapours produced during the reaction. In order to prevent undue dilution with water, the nitric acid should be at least 70% by weight aqueous solution and the sulphur acid at least 96% by weight aqueous solution.

The concentration of the oxidizing mixture must also be kept within the above-defined limits, e.g., by either of the methods mentioned, while the reaction is being heated, after the introduction of ethylene is complete, until evolution of gas ceases.

The process may be carried out by passing ethylene and the oxidizing mixture into a sealed apparatus under pressure, but is preferably carried out by the following proceuure. Ethylene in highly divided form is gradually introduced into a reactor partially charged with an aqueous mixture of sulphuric and nitric acids which satisfies the above-defined conditions, and which optionally contains a predetermined quantity of nitrogen dioxide at a rate such that at least the greater part of the ethylene is absorbed. At the same time, nitric acid is introduced into the reactor (with sulphuric acid if necessary) in order to maintain the acid concentrations within the desired limits. When the addition of ethylene is complete, heating of the reaction mixture is continued until no further gases are evolved. The oxalic acid formed may be isolated by any conventional methods, and its purity determined in the usual way.

Figure 2:
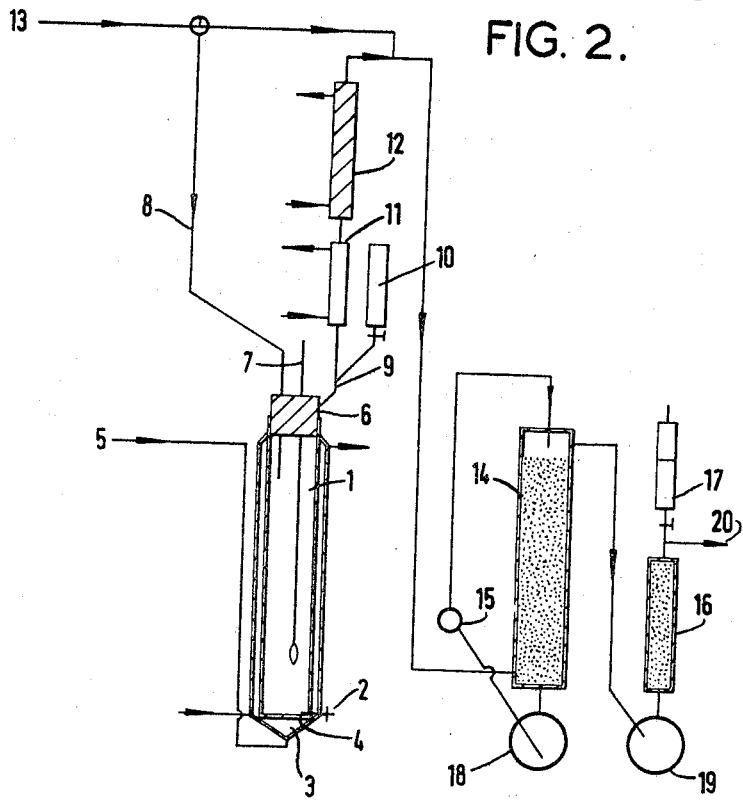

This process is conveniently carried out in apparatus as shown in FIGURE 2 of the accompanying drawings. In this apparatus a cylindrical glass reactor 1 having a height of 430 mm., a diameter of 60 mm. and a useful volume of 1200 cc., is equipped with a double jacket, an extraction tap 2 at its base, and a conical chamber 3 connected to the lower end of the reactor and closed off, at the junction with the reactor, by a plate 4 of fritted glass No. 3 (porosity 15–40μ). A pipe 5 is provided for the supply of ethylene or nitrogen to chamber 3; it extends from the apex of the conical chamber, and rises beside the outer wall of the reactor, and is adapted to be connected either to an ethylene cylinder or to a nitrogen cylinder. The reactor head consists of a ground-glass stopper 6 provided with a thermometer tube 7, a pipe 8 for the admission of oxygen or inert gas, which opens above the level of the reaction mass, and a Y pipe 9 connected on the one hand to a dropping funnel 10 and on the other hand to a straight condenser 11, on which there is mounted a coil-type condenser 12 (having a height of 150 mm.). Both condensers are supplied with iced water (at the rate of 90 litres per hour). An oxygen source 13 may supply oxygen to the reactor via pipe 8 or direct to the bottom of column 14 (of height 400 mm. and diameter 58 mm.) packed with Raschig rings, and mounted on a spherical receiver 18. The lower end of the column 14 is also connected to the upper part of condenser 12. The contents of receiver 18 may be insulated via pump 15 to the top of column 14. A second spherical receiver 19 mounted at the foot of a column 16 is also connected to the upper part of column 14; and a distilled-water reservoir 17 comprising a flow-adjusting valve in the collecting tube is mounted on column 16. A current of hot water is circulated through the double jacket of the reactor to keep it at the desired temperature. The effluent gases freed from the nitrous vapours in columns 14 and 16 are conducted through pipe 20 to a device (not shown) comprising two potassium hydroxide absorbers to absorb the carbon dioxide formed in the course of the reaction, and an Orsat apparatus for determining the unconverted ethylene by absorption in "sulphovanadic" reagent.

The reactions and the operating conditions employed in the new process lend themselves particularly well to continuous operation.

The following examples illustrate the invention.

EXAMPLE 1

The apparatus employed is that illustrated in FIGURE 2.

Before the reaction is begun, distilled water is introduced into the reservoir 17 and into the receiver 18, the temperature of the water circulating through the double jacket of the reactor 1 is adjusted to 50° C. and, while a gentle current of nitrogen is passed into the reactor to prevent any entry of liquid into the chamber 3, 847.2 g. of 70.2% nitric acid (i.e., 9.44 mol. of $HNO_3$ and 217 g. of 96% sulphuric acid, i.e., a mixture of sulphuric and nitric acids containing 56% of $HNO_3$, 20% of $H_2SO_4$ and 24% of water, are introduced into the reactor through the dropping funnel 10.

When the temperature in the reactor reaches 50° C., the current of nitrogen is stopped, and ethylene is introduced at a rate of 2.8 litres per hour (measured at 0° C./760 mm. Hg). At the same time, oxygen is admitted to the outlet of the coil condenser 12 at a rate of 7.3 litres per hour to oxidize the nitrous vapours leaving the reactor. Part of the vapours is condensed by the condensers 11 and 12 through which a current of ice-cold water is passed, and returns to the reactor. The remainder of the vapours goes into the absorbing system consisting of the column 14 through which is passed liquid from receiver 18 by the recycling pump 15, and the column 16 through which water is sprinkled drop-by-drop from reservoir 17.

After reaction has continued for 60 minutes at this rate, a mixture of 201 g. of 95% nitric acid and 40.3 g. of 96% sulphuric acid is gradually added to the reactor through the funnel 10. A total of 26.1 g. of ethylene (0.932 mol.) are passed into the reactor in 7 hours 40 minutes. Determination of the ethylene content of the gases leaving at 20 shows that 0.357 mol. has not been converted (corresponding to a conversion of 61.7%).

When the desired quantity of ethylene has been oxidised, the current of ethylene is stopped and a gentle current of nitrogen is passed into the reactor through 5. The reaction mass is left for 16 hours at 50° C. and then cooled to 25° C. A current of oxygen is then passed into the reactor above the level of the liquid for about 1 hour at a rate of 15 litres per hour to degas the apparatus and to ensure oxidation of any remaining nitrous vapours.

The weight of the mixture left in the reactor is 1198.5 g. Two test specimens were taken, one to determine the oxalic acid and the other to determine the nitric acid concentration in the reaction mixture. The oxalic acid is determined in the conventional way after it has been isolated by precipitation as calcium oxalate. The nitric acid content, both of the reaction mixture left in the reactor, and of liquors resulting from the oxidation of the nitrous vapours evolved and remaining in receivers 18 and 19, is formed by nitrometric determination using a Lunge volumenometer. The yield of oxalic acid based on the converted ethylene is 57.5%; final concentration of nitric acid in the reactor is 49.5%; the reactor contains 9.43 mols of nitric acid; and the receivers contain 1.95 mols of nitric acid.

EXAMPLE 2

Following the procedure of Example 1, a mixture formed of 432.2 g. of 96% sulphuric acid, 818.5 g. of 70% nitric acid and 33.8 g. of nitrogen peroxide is introduced into the reactor 1 through the dropping funnel 10. The concentrations in the mixture are respectively: $H_2SO_4$, 32.2%; $HNO_3$, 44.3%; $NO_2$, 2.6%; and water 20.9%. After the reaction has continued for 25 minutes as in Example 1, a mixture of 199 g. of 95% nitric acid and 80.1 g. of 96% sulphuric acid is gradually introduced into the reactor through the funnel 10. Thus, in a reaction time of 7 hours, 24.8 g. of ethylene (0.886 mol.) are passed into the reactor, and 0.331 mol. thereof are found in the effluent gases. The extent of conversion is therefore 62.6%.

After working up as in Example 1, it is found that the yield of oxalic acid based on the ethylene used is 82%; the final nitric acid concentration in the reactor is 39.1%; 8.78 mols of nitric acid remain in the reactor; and 3.11 mols of nitric acid are recovered from the receivers.

EXAMPLE 3

A series of experiments was carried out, in which the initial concentrations of the constituents of the oxidizing mixture are varied, the general operating conditions being otherwise the same as in Example 1. The concentrations of the acids are kept constant by the addition of nitric acid and sulphuric acid during the reaction.

| Experiment: | $HNO_3$ concentration, percent | $H_2SO_4$ concentration, percent | $NO_2$ concentration, percent | $H_2O$ concentration, percent | Percent Yield of oxalic acid based on ethylene used |
|---|---|---|---|---|---|
| 1 | 70 | 0 | 0 | 30 | 29 |
| 2 | 66.9 | 5 | 0 | 28.1 | 34 |
| 3 | 55.9 | 20 | 0 | 24.1 | 57.5 |
| 4 | 46.5 | 32.5 | 0 | 21 | 59.1 |
| 5 | 41 | 40 | 0 | 19 | 58.5 |
| 6 | 44.3 | 32.2 | 3 | 20.5 | 82 |
| 7 | 40.2 | 32.7 | 6.2 | 20.9 | 82 |
| 8 | 38.5 | 44.9 | 0 | 16.6 | 69.5 |
| 9 | 34.8 | 50 | 0 | 15.2 | 42.2 |
| 10 | 46.1 | 32.5 | 0.5 | 20.9 | 67 |

EXAMPLES 4 TO 9

In the reactor described in Example 1, a series of experiments is carried out under the operating conditions summarised in the following table, which also gives the results obtained.

| Temperature in °C. | Duration of the introduction of ethylene | Reaction time after introduction of ethylene in hours | Initial Concentrations | | | | Rate of Supply of ethylene at 0° C. and under 760 mm. Hg. | Final HNO₃ concentration, percent | Addition of HNO₃ in the course of the operation | Extent of conversion of C₂H₄, percent | Yield of oxalic acid based on C₂H₄ used, percent |
|---|---|---|---|---|---|---|---|---|---|---|---|
| | | | HNO₃, Percent | H₂SO₄, Percent | H₂O, Percent | NO₂, Percent | | | | | |
| Example: | | | | | | | | | | | |
| 4 | 50 | 7 hr., 20 min | 16 | 46.8 | 32.6 | 20.6 | 0 | 2.8 l./h | 35 | No | 58.4 | 64.7 |
| 5 | 50 | 7 hr., 10 min | 16 | 43.7 | 32.1 | 21.1 | 3.1 | 2.8 l./h | 34.7 | No | 51.3 | 79.7 |
| 6 | 50 | 7 hr., 25 min | 16 | 80 | 10 | 10 | 0 | 2.89 l./h | 65.5 | Yes | 87.7 | 45.9 |
| 7 | 50 | 7 hr., 20 min | 16 | 80.1 | 4.9 | 15 | 0 | 2.81 l./h | 64 | Yes | 74.9 | 58 |
| 8 | 50 | 7 hr., 25 min | 16 | 65.4 | 3.1 | 28.2 | 3.3 | 3.1 l./h | 60.9 | Yes | 52.2 | 38.5 |
| 9 | 50 | 6 hr., 55 min | 16 | 46.1 | 32.5 | 20.9 | 0.5 | 2.9 l./h | 37.9 | Yes | 70 | 70.2 |

We claim:

1. Process for the preparation of oxalic acid which comprises oxidizing ethylene with a hot mixture of 30 to 80% by weight of nitric acid, 5 to 50% by weight of sulphuric acid, and 10 to 40% by weight of water, this composition being maintained throughout the oxidation.

2. Process according to claim 1, in which the reaction mixture also contains up to 5% by weight of nitrogen peroxide, being then possible for the proportion of sulfuric acid to be lowered below the minimum value of 5%.

3. Process according to claim 1, in which the mixture contains 40 to 70% by weight of nitric acid, 5 to 40% by weight of sulphuric acid, 20 to 30% by weight of water, and 0 to 5% by weight of nitrogen peroxide.

4. Process according to claim 1, in which the oxidation is effected at 35° to 80° C.

5. Process according to claim 4, in which the oxidation is effected at 50° to 70° C.

6. Process according to claim 1, in which the reaction mixture is heated after introduction of ethylene has ceased, until oxides of nitrogen are no longer evolved.

References Cited

UNITED STATES PATENTS 3,081,345  3/1963  Carlson et al. _____ 260—533

OTHER REFERENCES

Kearns et al., Chem. Abstr. 17: 2106 (1923).
Busse, Chem. Abstr. 40: (1946).

LORRAINE A. WEINBERGER, *Primary Examiner.*

D. STENZEL, *Assistant Examiner.*